(12) United States Patent
Miret et al.

(10) Patent No.: US 8,336,424 B2
(45) Date of Patent: Dec. 25, 2012

(54) ROTARY CONTROL KNOB ASSEMBLY

(75) Inventors: Josep Jacas Miret, S. Pere de Ribes (ES); Alberto Garcia Briz, Valls (ES)

(73) Assignee: Lear Corporation, Southfield, MI (US)

( * ) Notice: Subject to any disclaimer, the term of this patent is extended or adjusted under 35 U.S.C. 154(b) by 584 days.

(21) Appl. No.: 11/899,804

(22) Filed: Sep. 7, 2007

(65) Prior Publication Data

US 2009/0064809 A1 Mar. 12, 2009

(51) Int. Cl.
  *F16H 35/18* (2006.01)
  *G05G 1/10* (2006.01)
  *G09G 5/00* (2006.01)
  *G06F 3/033* (2006.01)

(52) U.S. Cl. ............ 74/553; 74/10 R; 345/156; 345/184

(58) Field of Classification Search .................. 200/308, 200/336, 527, 564; 345/184, 156; 362/489; 250/231.13; 74/10 R, 553; *G01D 5/36, 5/244*
See application file for complete search history.

(56) References Cited

U.S. PATENT DOCUMENTS

| | | | |
|---|---|---|---|
| 4,318,095 A * | 3/1982 | Fukuoka | 345/184 |
| 4,336,446 A | 6/1982 | Hafner | |
| 4,934,061 A * | 6/1990 | Knight et al. | 33/403 |
| 5,072,078 A * | 12/1991 | Rao et al. | 200/11 R |
| 5,936,613 A | 8/1999 | Jaeger et al. | |
| 6,583,676 B2 | 6/2003 | Krah et al. | |
| 6,670,874 B1 * | 12/2003 | Galli | 335/205 |
| 6,696,984 B2 * | 2/2004 | Choi | 341/6 |
| 7,046,230 B2 | 5/2006 | Zadesky et al. | |
| 7,075,527 B2 | 7/2006 | Takagi et al. | |
| 7,327,348 B2 * | 2/2008 | Goldenberg et al. | 345/156 |
| 7,391,207 B2 * | 6/2008 | Oohira | 324/207.25 |
| 7,825,367 B2 * | 11/2010 | Nakamura et al. | 250/231.13 |
| 7,887,222 B2 * | 2/2011 | Fanfa et al. | 362/489 |
| 8,144,126 B2 * | 3/2012 | Wright | 345/173 |
| 2004/0017355 A1 * | 1/2004 | Shim | 345/157 |
| 2006/0038783 A1 * | 2/2006 | Shaw et al. | 345/163 |
| 2006/0125785 A1 * | 6/2006 | McAlindon | 345/156 |
| 2007/0152988 A1 * | 7/2007 | Levin et al. | 345/184 |
| 2008/0055241 A1 * | 3/2008 | Goldenberg et al. | 345/156 |
| 2009/0107287 A1 * | 4/2009 | Seki | 74/504 |

(Continued)

FOREIGN PATENT DOCUMENTS

DE 2853505 C2 6/1980

(Continued)

OTHER PUBLICATIONS

English Abstract of DE 19648500.*

(Continued)

*Primary Examiner* — Vinh Luong
(74) *Attorney, Agent, or Firm* — MacMillan, Sobanski & Todd, LLC

(57) ABSTRACT

A control knob assembly includes a housing and a knob mounted for rotary motion on the housing about a pivot axis. A cursor is mounted on the knob and spaced from the pivot axis. The cursor moves in a circular path as the knob is rotated. The assembly further includes a plurality of sensors spaced in a linear arrangement along a linear axis. Each of the sensors generates a signal upon detection of the presence of the cursor when the cursor is adjacent the sensor as the cursor moves along its circular path. The signal is representative of an angular position of the knob relative to the housing.

4 Claims, 4 Drawing Sheets

U.S. PATENT DOCUMENTS

2010/0181468 A1 * 7/2010 Nakamura et al. ....... 250/231.13

FOREIGN PATENT DOCUMENTS

| DE | 19648500 | * | 3/1998 |
| DE | 19947529 | A1 | 5/2000 |
| DE | 10126076 | A1 | 12/2002 |
| EP | 0330150 | A2 * | 8/1989 |
| JP | 2007198942 | A | 8/2007 |
| WO | WO 2007/086160 | * | 8/2007 |

OTHER PUBLICATIONS

English Abstract of DE 19648500, Ronald, Mar. 1998.*

Office Action dated Mar. 19, 2010 from the German Patent & Trademark Office in Case No. 10 2008 031 963.5-26.

First Office Action to Chinese Invention Patent Application No. 200810215501.6 in the name of Lear Corporation.

* cited by examiner

US 8,336,424 B2

ROTARY CONTROL KNOB ASSEMBLY

BACKGROUND OF THE INVENTION

This invention relates in general to rotary input devices or control knobs for controlling an electrical device. Rotary control knobs are commonly used to control a variety of electronic devices ranging from portable handheld devices to control panels such as those mounted in a vehicle for controlling audio, video, heating and ventilation, and navigation systems. The control knobs are mounted for rotary movement and are manually rotated by a user to control or provide some input to the electrical device. The user simply rotates the knob to a desired rotational position to provide an input for controlling the device in some predetermined manner.

One common control knob is a rotary electromechanical switch or encoder. A rotary electromechanical switch is a device that has a rotating shaft connected to one terminal capable of physically making or breaking a connection to one or more other terminals oriented in an arcuate or circular path. Because of the mechanical nature of the rotary electromechanical switch, the switch may break or malfunction over time from use.

It is also known to use a rotary control knob employing sensors instead of mechanical contact switches or potentiometers. The sensors detect the rotational movement of a knob and generate signals which are sent to a control device, such as a microprocessor, for determining the rotational position of the knob. Examples of known sensors for rotary control knobs include Hall effect sensors, photoelectric sensors, radio frequency sensors, and capacitive sensors. U.S. Pat. No. 5,936,613 discloses an embodiment of a rotary knob that uses a capacitive sensor assembly. The capacitor assembly includes a pair of arcuate traces that are oriented in a circular orientation about the rotational axis of the knob. The traces have varying widths along their length. An oscillator circuit is electrically connected to the traces. A conductive plate is secured to the knob and positioned in a slightly spaced relationship from the circular traces. As the knob is turned, the conductive plate moves in an arcuate path passing over the length of the traces and in cooperation with the oscillator circuit provides a signal representative of the position of the knob.

SUMMARY OF THE INVENTION

This invention relates to a control knob assembly includes a housing and a knob mounted for rotary motion on the housing about a pivot axis. A cursor is mounted on the knob and spaced from the pivot axis. The cursor moves in a circular path as the knob is rotated. The assembly further includes a plurality of sensors spaced in a linear arrangement along a linear axis. Each of the sensors generates a signal upon detection of the presence of the cursor when the cursor is adjacent the sensor as the cursor moves along its circular path. The signal is representative of an angular position of the knob relative to the housing.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
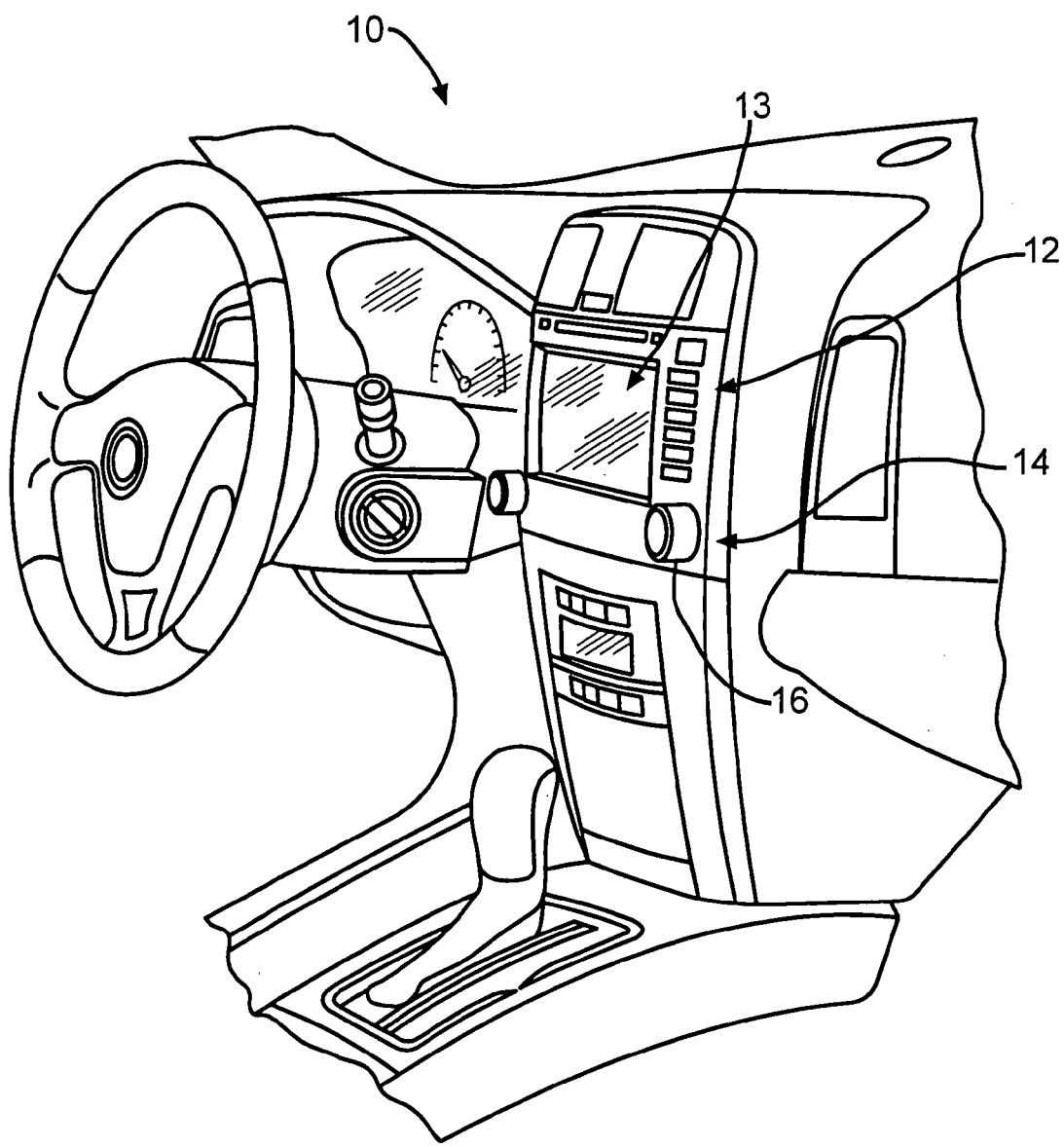
FIG. 1 is a perspective view of an instrument panel of a vehicle which includes a control panel having control knobs mounted thereon.
Figure 2:
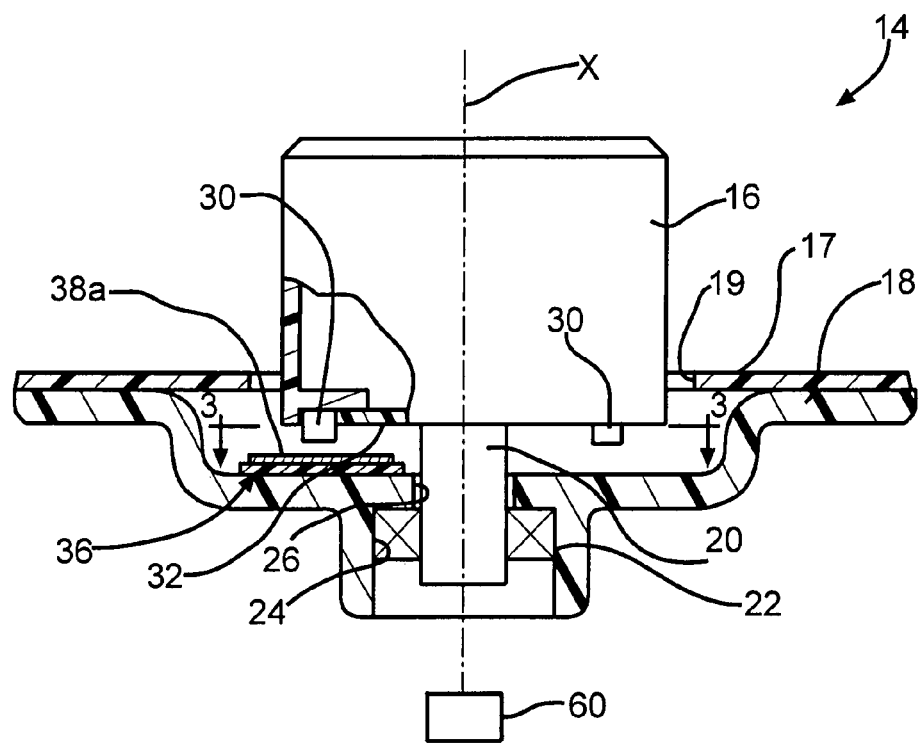
FIG. 2 is a cross-sectional view taken through the control panel at one of the control knob assemblies.

Referring now to the drawings, there is illustrated in FIG. 1 a vehicular instrument panel, indicated generally at 10. The instrument panel 1 includes a control panel 12 having various controls, button, and displays thereon. The control panel 12 is used to operate and control various vehicle electrical devices, indicated generally at 13, such as climate control systems, audio and video systems, and navigation systems. The control panel 12 includes at least one rotary control knob assembly 14. In the illustrated embodiment, there are two rotary knob assemblies 14. As best shown in FIG. 2, the control knob assembly 14 includes a knob 16 mounted for rotary movement on a housing 18. The housing 18 may include an optional covering layer 17 mounted thereon which includes an opening 19 through which the knob 16 extends. The knob 16 has a generally cylindrical shape and is manually rotated by a user or passenger in the vehicle to control or provide some input to the device 13. The user rotates the knob 16 to a desired rotational position to provide an input for controlling the device 13 in some predetermined manner. For example, the device 13 may includes a visual display in which the control knob assembly 14 is used to access and select a menu of operations for controlling the device 13. Although the control knob assembly 14 is shown and described as being used with a vehicle electrical device 13, it should be understood that the control knob assembly 14 can be used as an input device for any type of device or component, such as for example, hand held devices and non-vehicular electrical equipment.

Figure 3:
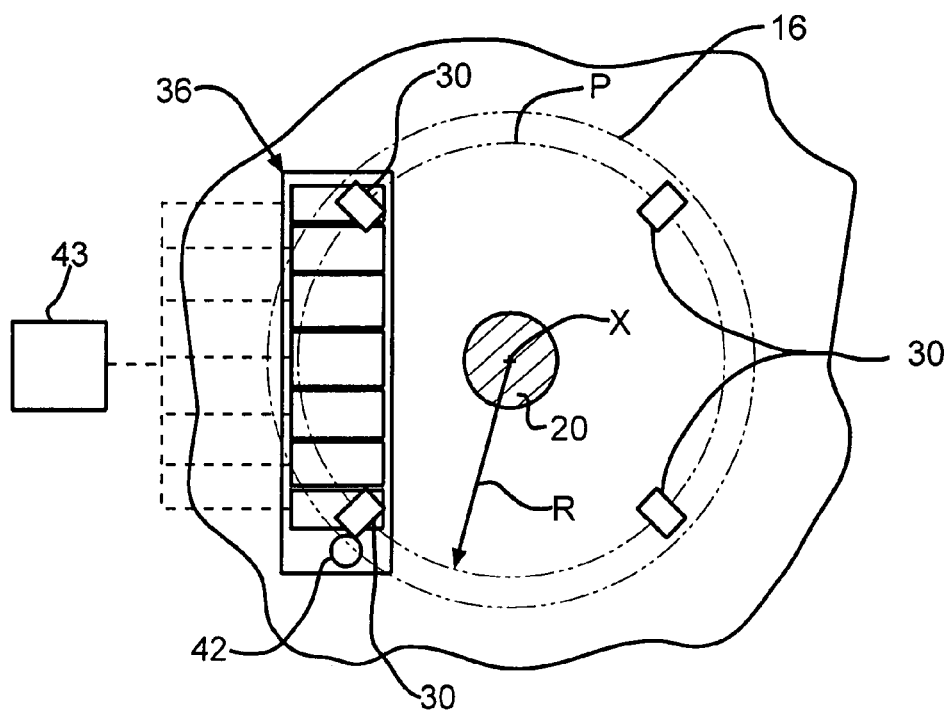
FIG. 3 is a cross-sectional view taken along lines 3-3 of FIG. 2.

As best shown in FIGS. 2 and 3, the knob 16 of the control knob assembly 14 is mounted for rotational movement on the housing 18 about a pivot axis X. In the illustrated embodiment, the knob 16 is mounted on a shaft 20. In one embodiment, the shaft 20 is rotatably mounted on the housing 18 by a bushing or bearing assembly, indicated schematically at 22. The bearing assembly 22 can be any suitable structure for facilitating a rotating connection between the knob 16 and the housing 18. The bearing assembly 22 can be a roller or ball bearing assembly. Alternatively, the bearing assembly 22 can be a bushing made of a material for reducing friction. The bearing assembly 22 is housed within a recess 24 formed in the housing 18. The housing 18 can be any suitable structure for securing the control knob assembly 14. In the illustrated embodiment, the housing 18 is defined as a portion of a plastic interior trim panel 24. The housing 18 includes a hole 26 through which the shaft 20 extends. It should be understood that the knob 16 can rotatably mounted on or relative to the housing 18 by any suitable manner. The knob assembly 14 may or may not include a shaft 20 and/or a bearing assembly 22. For example, the housing 18 could include a recess or groove formed therein that mates with a cooperating circumferential recess or groove formed on the knob 16 such that the knob rotatably slides relative to the housing 18.

Figure 4:
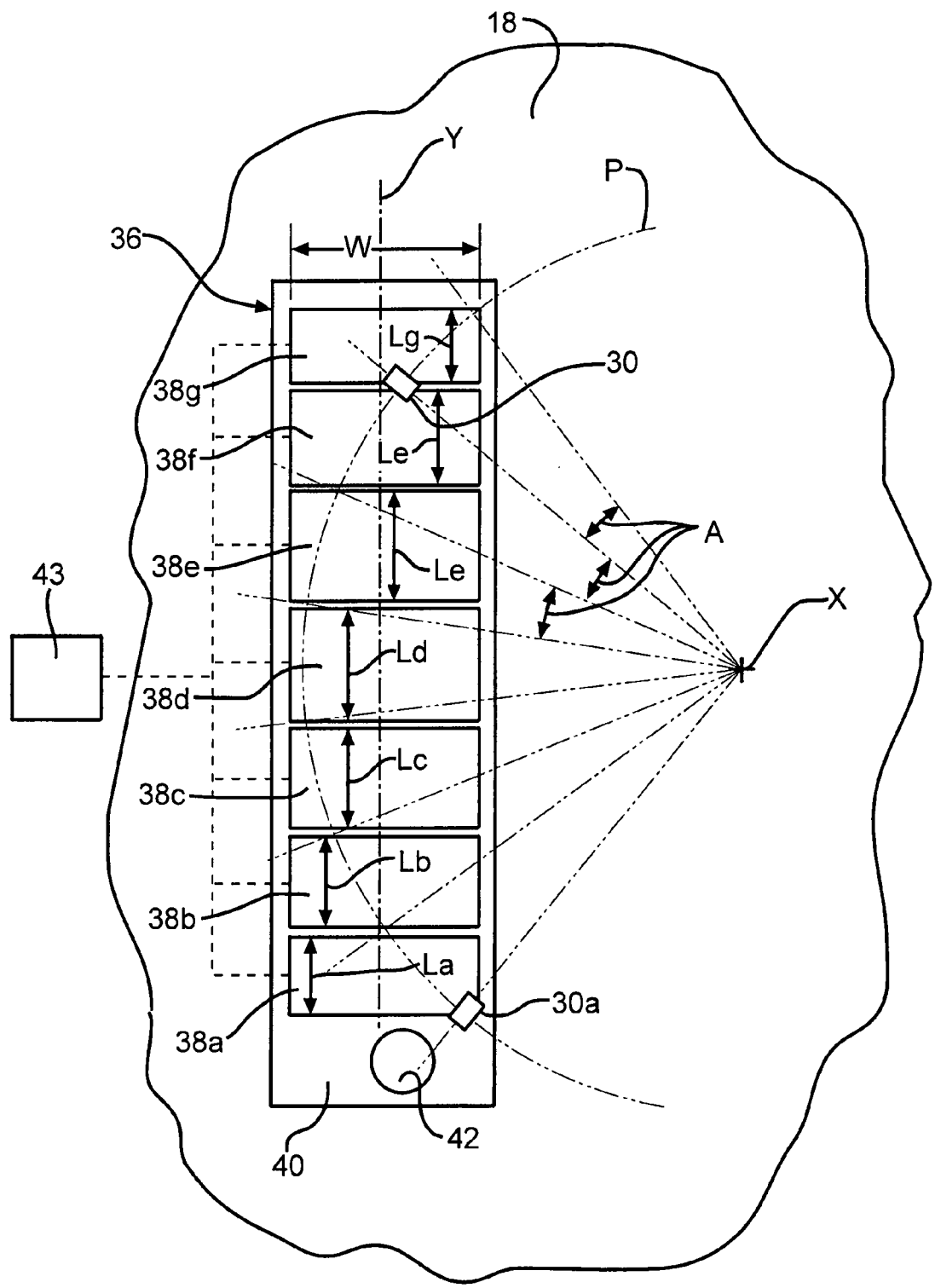
FIG. 4 is a schematic illustration illustrating the path movement of cursors over sensor pads of the control knob assembly.

The knob 16 includes a plurality of cursors 30 mounted thereon. As will be explained below, the cursors 30 function as part of a sensing system for detecting the rotational position of the knob 16 relative to the housing 18. The cursors 30 are positioned in a radially spaced relationship from the pivot axis X. As best shown in FIG. 2, the cursors 30 extend from a proximal portion 32 of the knob 16 in a direction towards the housing 18. The cursors 30 can be connected to the knob 16 by any suitable manner, such as by a press fit, interference fit, adhered or connected by fasteners. The cursors 30 may be made of any material. In one embodiment, the cursors 30 are made of a metallic material, such as aluminum, copper, or iron. In the embodiment of the knob assembly 14, as best shown in FIG. 4, four cursors 30 are mounted in an equally circumferentially spaced arrangement such that each cursor is circumferentially spaced 90 degrees from an adjacent one. As the knob 16 is rotated, the cursors 30 move along a circular path P having a predetermined radius R from the pivot axis X.

The control knob assembly 14 further includes a sensor assembly, generally indicated at 36. The sensor assembly 36 includes a plurality of sensor pads 38a-g mounted on a board 40. As will be explained below, the sensor pads 38a-g function as part of a sensing system for detecting the rotational position of the knob 16 relative to the housing 18 by detecting the presence of a cursor 30 adjacent thereto. Although the illustrated embodiment of the sensor assembly 36 includes seven sensor pads 38a-g, it should be understand that the sensor assembly 36 may include fewer or more sensor pads 38a-g. The board 40 is mounted on the housing 18 such that the sensor pads 38a-g face the proximal side 32 of the knob 16. As will be discussed in more detail below, the sensor assembly 36 is generally mounted on the housing along the path P of the cursors 30 such that the cursors 30 will move over the sensor pads 38a-g as the knob 16 is rotated. The board 40 may be in the form of a printed circuit board and can include various electronic devices, indicated schematically at 42, such as for a capacitive sensing system. The sensor pads 38a-g may be formed on the board 40 as metallic traces engraved on board 40. For example, the sensor pads 38a-g can be copper patterns engraved or otherwise deposited on a non-conductive substrate of the board 40. Alternatively, the sensor pads 38a-g may be separate components individually mounted on the board 40.

In one embodiment, the sensor assembly 36 functions as a proximity sensing system such that the presence of the cursors 30 above (or adjacent to) the sensor pads 38a-g can be detected. In a more specific embodiment, the cursors 30 and the sensor pads 38a-g cooperate to function as part of a capacitive sensing system. Capacitive sensing systems generally translate effective capacitance to a signal, such as a binary signal, whose state determines whether that effective capacitance has been exceeded. The effective capacitance relates to a distance between an object, such as the cursor 30, and a sensor plate, such as the sensor pads 38a-g. Thus, the presence of a cursor 30 above the area of one of the sensor pads 38a-g is detected by the respective sensor pad 38a-g due to the change in capacitance. The sensor pads 38a-g may use any suitable way of measuring this capacitance. For example, an electric field can be created about the sensor pads 38a-g which is disrupted upon the presence of a cursor 30 within this field. Additionally, the electronic devices 42 of the sensor assembly 36 may include an oscillator circuit which converts the changes in capacitance into voltage signal changes. A control device, indicated schematically at 43, such as a microprocessor, receives the voltage signal and determines whether the cursor 30 is above the respective sensor pad 38a-g depending on the change in voltage. The signal may be received by the device 43 either wirelessly or by a wired electrical connection between the device 43 and the sensor pads 38a-g.

In the embodiment shown in FIGS. 3 and 4, the sensor pads 38a-g are aligned in a linear arrangement along a linear axis Y. The linear axis Y is spaced from the pivot axis X of the knob 16. In the illustrated embodiment, the sensor pads 38a-g have a rectangular shape, wherein each of the sensor pads 38a-g has a common width W. However, the plurality of sensor pads 38a-g may have differing lengths compared to one another. For example, the sensor pad 38d which is closest to the pivot axis X has a length $L_d$ which is greater than the lengths of the other pads. The lengths of the sensor pads 38a and 38g which are furthest from the pivot axis X have lengths $L_a$ and $L_g$, respectively, which are less than the lengths of the sensor pads 38b, 38c, 38e, and 38f. In this illustrated embodiment, the lengths of the sensor pads 38a-g decreases as their distance from the pivot axis X increases. Thus, the lengths (and the areas) of the sensor pads differ in a gradient manner such that the length of the sensor pads decreases as its distance from the pivot axis increases, the reason for which will be explained below.

In operation, the user rotates the knob 16 to provide input for controlling a device 13. For example, the device 13 could be a climate control system, an audio and video system, and/or a navigation system. The knob 16 may be manually rotated by the user. Alternatively or additionally, the knob assembly 14 may be rotated with the assistance of an electrical motor (not shown), such as for example, based on input from a user operating an infra-red or radio frequency remote control. As the knob 16 is rotated about the pivot axis X, the cursors 30 will move along the path P. Note that the sensor pads 38a-g are generally located under the path P of the cursors 30. For ease of discussion, the operation will be described with respect to a cursor 30a, shown in FIG. 4, which is rotated in a clockwise direction along the path P. As shown in FIG. 4, the cursor 30a is shown generally adjacent the sensor pad 38a. As the cursor 30a moves along the path P in a clockwise direction, the cursor 30a will pass above the rectangular area of the sensor 38a. In one embodiment of the sensors 38a-g, the sensor 38a emits an electric field. As the cursor 30a passes over the electric field, the sensor assembly 36 detects a change in capacitance and generates a representative signal. The control device 43 receives and monitors the signal for determining whether the cursor 30a is above the sensor pad 38a due to the change in capacitance. It is noted that in the embodiments shown in FIGS. 3 and 4, the area of the sensor pads 38a-g are dimensioned such that the cursors 30 will be above a sensor pad 38a-g during a 15 degree sweep, as represented by the angles A in FIG. 4, through the path P regardless of the position of the respective sensor pad 38a-g relative to the pivot axis X. Further clockwise movement of the cursor 30a will advance the cursor 30a above the sensor pad 38b. The change in capacitance with respect to the sensors 38a and sensor 38b is detected by the control device 43. Thus, the control device 43 is able to detect when the cursor 30a moves from above one sensor to another adjacent sensor. This detection enables the control device 43 to determine the rotation of the knob 16 relative to the housing 18 when the cursor 30a has moved from above one sensor pad to another sensor pad. In the illustrated embodiment, the control device 43 is able to detect every 15 degree of rotational movement for a total of 24 positions per revolution of the knob 16. Of course, any number of sensor pads and cursors may be used to detect rotational movement in any number of increments other than 24. The control device 43 may also be able to detect whether the knob 16 is being turned in the clockwise or counter-clockwise direction by detecting which sensor pads the cursor 30a mover over. For example, if the control device 43 detects that the cursor 30a moves from above the sensor pad 38a to the sensor pad 38b, then the knob 16 is being rotated in a clockwise direction. If desired, the control device 43 not only is able to detect the location of the cursor 30 relative to the sensor assembly 36, but can detect the rotational velocity of the knob 16. For example, the control device 43 may be able to determine the difference in time when the cursor 30 moves from above one sensor pad to another, thereby determining the rotational velocity and adjust the input signal according to a predetermined manner.

In the illustrated embodiment, there are seven sensor pads 38a-g and four cursors 30. This dimensional arrangement provides that at least one cursor 30 will always be over one the sensor pads 38a-g regardless of the position of the knob 16. Thus, by having four cursors 30, the size of the sensor assembly 36 can be reduced and have a relatively small number of sensor pads 38a-g.

Note that while the cursors 30 are shown having a generally rectangular shape in FIG. 4, the cursor 30 can have any shape. The cursors 30 may also have any size relative to the sensor pads 38a-g. It may be desirable to size the cursors 30 such that they are large enough to trigger the capacitive sensing when interrupting the electric field, but small enough so as not to effect multiple readings when one portion of a cursor 30 is above a first sensor pad and the other portion of the cursor 30 is above a second sensor pad adjacent to the first sensor pad.

It should be understood that the cursors 30 and the sensor pads 38a-g need not function as part of a capacitive sensing system and that the cursors 30 and the sensor pads 38a-g may function as other proximity sensor systems, such as for example Hall effect sensors, photoelectric, optical, and radio frequency sensors. The sensor pads 38a-g may include any circuitry or components which detects the presence of a cursor 30 adjacent thereto.

If desired, the knob 16 may be operated to provide other forms of input other than rotation of the knob 16. For example, the knob 16 may have one or more switches (not shown) mounted thereon which can be operated by the user. As another example, the knob 16 may be connected to a push switch assembly, indicated schematically at 60, which is connected to the control device 43. Pulling and/or pressing on the knob 16 along the axis X operates the push switch assembly 60. Thus, the knob 16 can provide input by both rotating and pushing/pulling the knob 16.

Figure 5:
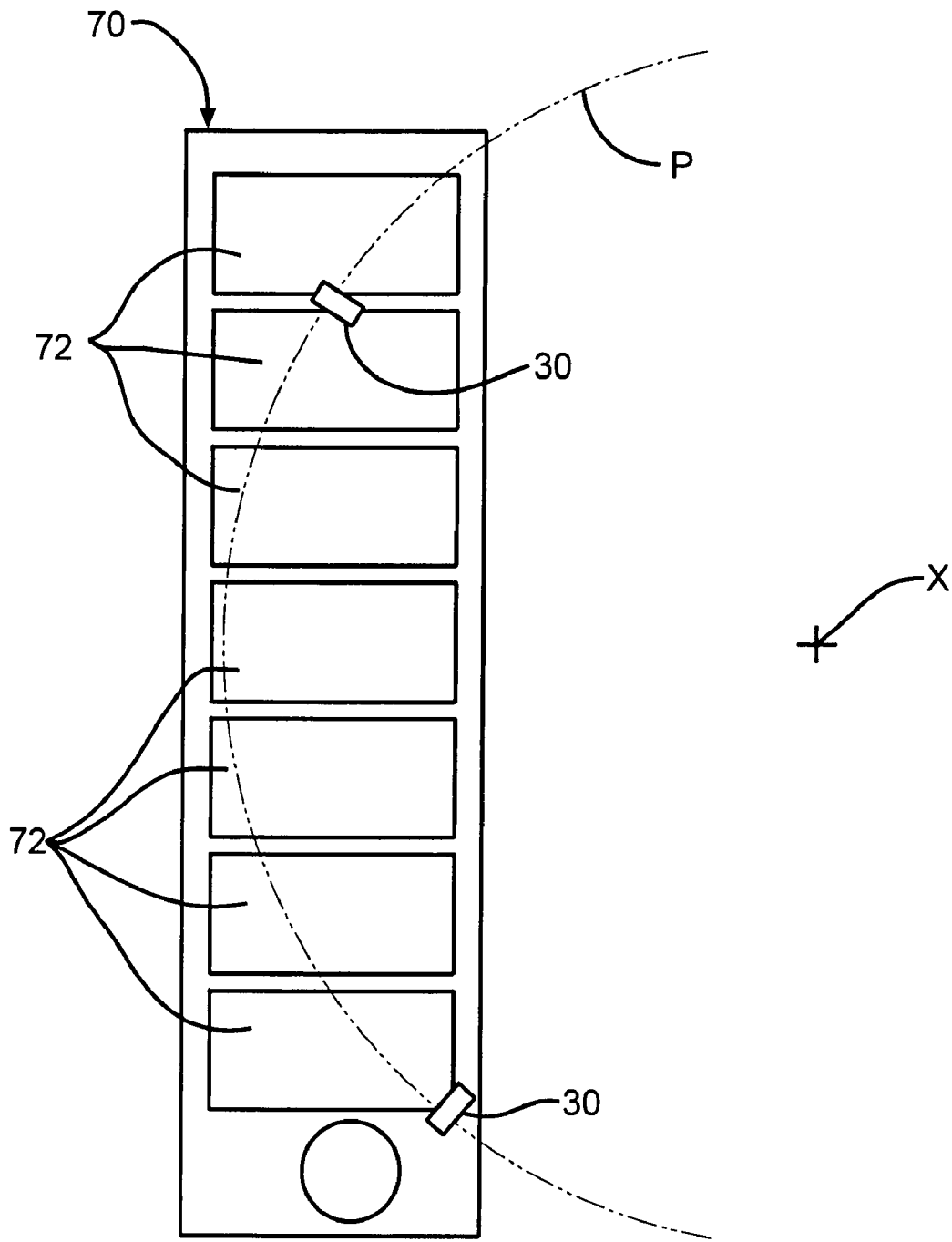
FIG. 5 is a schematic illustration of an alternate embodiment of a sensor pad assembly.

As stated above, the sensor pads 38a-g need not be sized and configured as shown in FIGS. 3 and 4, but may have any suitable shape. There is illustrated in FIG. 5 an alternate embodiment of a sensor assembly 70, which may be used for the sensor assembly 36. The sensor assembly 70 is similar in structure and function as the sensor assembly 36 described above. One of the exceptions is that the sensor assembly 70 includes a plurality of sensor pads 72 that each has approximately the same size. Such a configuration may be more economical to manufacture particularly in instances in which the sensor pads 72 are separate components mounted on the board of the sensor assembly 70. The sensor pads 72 are aligned in a linear arrangement similar to the sensor pads 38a-g. In the illustrated embodiment, the sensor pads 72 have a generally rectangular shape. Since the sensor pads 72 are the same size but are located at different distances from the pivot axis X, the angular distance of the cursors 30 moving across the areas of the sensor pads 72 may not be uniform, such as for example, compared to the 15 degree sweep with respect to the sensor assembly 36. Thus, the detectable angular distance in which the cursor 30 is over the sensor pad 72 closest to the pivot axis X may be less than the angular distance in which the cursor 30 is over the sensor pad 72 located farthest from the pivot axis X. Although these angular distances may not be uniform, the differences may be sufficiently small enough that they are generally undetectable or negligible by the user.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A signal generating assembly comprising:
   a knob defining an axis and supporting a cursor at a location that is spaced apart from the axis; and
   a plurality of sensors that differ in size in a gradient manner and that are aligned in a linear arrangement relative to the axis such that rotational movement of the knob relative to the plurality of sensors causes the cursor to be moved adjacent to each of the plurality of sensors;
   wherein each of the plurality of sensors generates a signal when the cursor is positioned adjacent thereto within an angle of relative rotational movement; and
   wherein the angle of relative rotational movement in which each of the plurality of sensors generates the signal is the same for each of the plurality of sensors.

2. The signal generating assembly defined in claim 1 wherein adjacent ones of the plurality of linearly aligned sensors have different shapes.

3. The signal generating assembly defined in claim 1 wherein adjacent ones of the plurality of linearly aligned sensors have different sizes.

4. The signal generating assembly defined in claim 1 wherein adjacent ones of the plurality of linearly aligned sensors have different shapes and different sizes.

* * * * *